(12) United States Patent
Ishizaki et al.

(10) Patent No.: US 11,682,989 B2
(45) Date of Patent: Jun. 20, 2023

(54) MOTOR CONTROL DEVICE

(71) Applicant: MITSUBISHI ELECTRIC CORPORATION, Tokyo (JP)

(72) Inventors: Junki Ishizaki, Tokyo (JP); Yasuhiko Wada, Tokyo (JP); Akihiro Tsumura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 177 days.

(21) Appl. No.: 17/420,092

(22) PCT Filed: Mar. 7, 2019

(86) PCT No.: PCT/JP2019/008991
§ 371 (c)(1),
(2) Date: Jun. 30, 2021

(87) PCT Pub. No.: WO2020/179041
PCT Pub. Date: Sep. 10, 2020

(65) Prior Publication Data
US 2022/0094284 A1     Mar. 24, 2022

(51) Int. Cl.
*H02P 5/74* (2006.01)
(52) U.S. Cl.
CPC ..................................... *H02P 5/74* (2013.01)
(58) Field of Classification Search
CPC .... H02P 5/74; H02P 3/18; H02P 27/08; H02P 29/024; H02P 5/46
USPC .................................................. 318/112, 34
See application file for complete search history.

(56) References Cited

U.S. PATENT DOCUMENTS 7,808,203 B2 * 10/2010 Tomigashi .............. H02P 23/14
318/808

FOREIGN PATENT DOCUMENTS

JP     2007-259554 A     10/2007
JP     2011-045172 A     3/2011

OTHER PUBLICATIONS

International Search Report of the International Searching Authority dated Jun. 11, 2019 for the corresponding international application No. PCT/JP2019/008991 (and English translation).

* cited by examiner

*Primary Examiner* — David Luo
(74) *Attorney, Agent, or Firm* — Posz Law Group, PLC

(57) ABSTRACT

A motor control device includes: a power converter to which a first motor and a second motor are connected in parallel, the power converter being configured to convert a direct-current voltage into an alternating-current voltage and supply the alternating-current voltage to the first motor and the second motor; a switching unit provided between the second motor and the power converter; a current detector configured to detect an electric current flowing through the first motor and the second motor; and a controller configured to control the power converter based on at least a current value detected by the current detector. The controller deactivates the power converter upon receiving from outside an abnormal step signal, attributed to the occurrence of an abnormality, that excludes a normal stop signal representing a stop command and switches the switching unit from an on state to an off state upon deactivation of the power converter.

8 Claims, 9 Drawing Sheets

MOTOR CONTROL DEVICE

CROSS REFERENCE TO RELATED APPLICATION

This application is a U.S. national stage application of PCT/JP2019/008991 filed on Mar. 7, 2019, the contents of which are incorporated herein by reference.

TECHNICAL FIELD

The present disclosure relates to a motor control device configured to control two motors.

BACKGROUND ART

Hitherto, there has been disclosed an example of a drive device configured such that a plurality of motors are connected in parallel to a single inverter and the plurality of motors are driven by the single inverter (see, for example, Patent Literature 1). The drive device disclosed in Patent Literature 1 has a switch such as a relay provided between the inverter and each motor. This drive device is configured such that the plurality of motors are stopped by bringing the inverter into an off state and turning off a plurality of the switches corresponding to the plurality of motors.

CITATION LIST

Patent Literature

Patent Literature 1: Japanese Unexamined Patent Application Publication No. 2007-259554

SUMMARY OF INVENTION

Technical Problem

However, Patent Literature 1 fails to clearly disclose the timing for turning off the switches when stopping the inverter. In the drive device disclosed in Patent Literature 1, turning off the switches before the inverter comes to a complete stop causes the plurality of motors to become disconnected from the inverter while an electric current is being supplied to the plurality of motors. In this case, the electric current flowing between the plurality of motors may become a circulating current. The circulating current is an alternating current. Mistiming the turning off of the switches leads to occurrences of surges in the motors due to the circulating current. This may result in demagnetization of permanent magnets provided in the motors.

The present disclosure has been made to solve the above problems, and provides a motor control device configured to prevent demagnetization of two motors connected in parallel to a single power converter.

Solution to Problem

A motor control device according to an embodiment of the present disclosure includes: a power converter to which a first motor and a second motor are connected in parallel, the power converter being configured to convert a direct-current voltage into an alternating-current voltage and supply the alternating-current voltage to the first motor and the second motor; a switching unit provided between the second motor and the power converter and configured to switch between an on state in which the second motor is electrically connected to the power converter and an off state in which the second motor is electrically disconnected from the power converter; a current detector configured to detect an electric current flowing through the first motor and the second motor; and a controller configured to control the power converter based on at least a current value detected by the current detector. The controller includes a power control unit configured to deactivate the power converter upon receiving from outside an abnormal stop signal, attributed to occurrence of an abnormality, that excludes a normal stop signal representing a stop command, and a switching control unit configured to switch the switching unit from the on state to the off state upon deactivation of the power converter.

Advantageous Effects of Invention

According to the embodiment of the present disclosure, the power converter is deactivated at the occurrence of an abnormality, and the switching unit is switched from the on state to the off state after deactivation of the power converter. This makes it possible to reduce a circulating current flowing between the two motors and prevent demagnetization of each motor.

DESCRIPTION OF EMBODIMENTS

Embodiment 1

A motor control device of Embodiment 1 is configured such that a single inverter drives a plurality of motors and a switching unit such as a relay is used to control switching of the number of motors to be driven.

Figure 1:
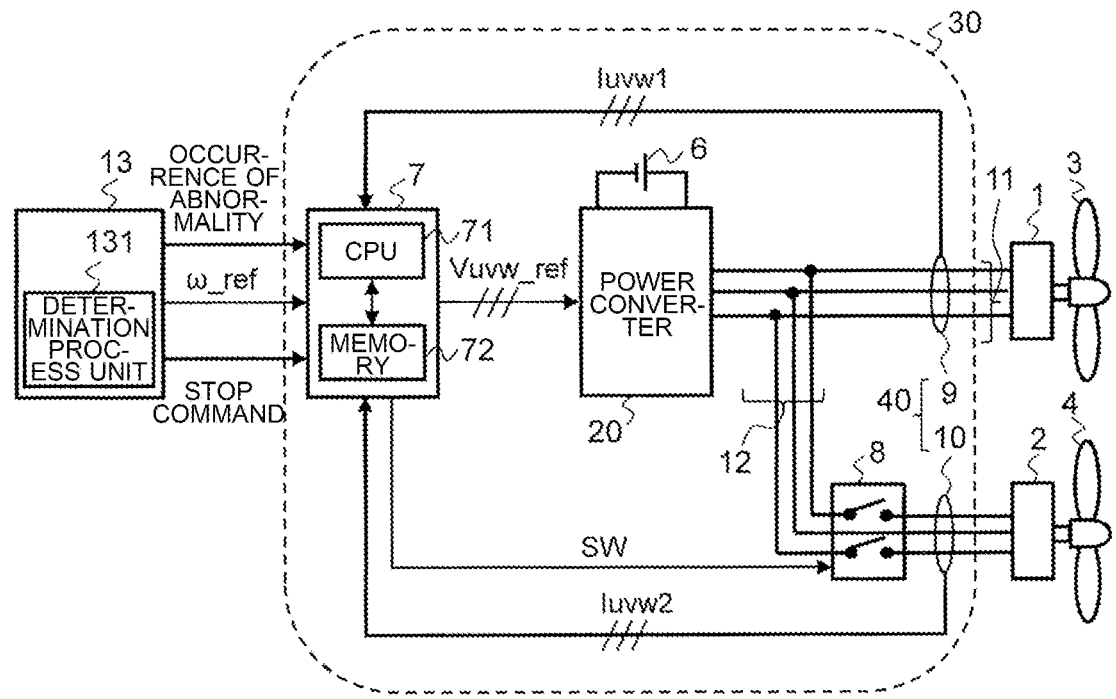
FIG. 1 is a block diagram showing an example configuration of a motor control device according to Embodiment 1 of the present disclosure.

A configuration of a motor control device of Embodiment 1 is described. FIG. 1 is a block diagram showing an example configuration of a motor control device according to Embodiment 1 of the present disclosure. A motor control device 30 includes a power converter 20 connected to a power source 6 and a controller 7 configured to control how the power converter 20 operates. The motor control device 30 is intended to control a first motor 1 and a second motor 2 that are connected in parallel to the power converter 20. In Embodiment 1, the power source 6 is a direct-current voltage power source configured to supply electric power to the first motor 1 and the second motor 2 via the power converter 20. For convenience of explanation, the following simply uses a term "motor" to refer to either of the first and second motors 1 and 2.

The first motor 1 is connected to the power converter 20 via a three-phase power line 11. A three-phase power line 12 branching off from the middle of the three-phase power line 11 is connected to the second motor 2. The second motor 2 is connected to the power converter 20 via the three-phase power line 12 and the three-phase power line 11.

The first motor 1 and the second motor 2 each have a rotor (not illustrated) and a stator (not illustrated). The stator has three phases, namely U, V, and W phases, of winding. The rotor is provided with a permanent magnet. With an electric current flowing through the winding in accordance with a three-phase voltage that is applied from the power converter 20 to each motor, the stator generates a rotating magnetic field around the rotor.

In the example configuration shown in FIG. 1, a first fan 3 is attached to the first motor 1, and a second fan 4 is attached to the second motor 2. The first motor 1 and the second motor 2 constitute, for example, a part of an air-sending system provided in an air-conditioning apparatus.

The motor control device 30 is provided with a current detector 40 composed of a first current sensor 9 configured to detect a three-phase current luvw1 flowing through the winding of the first motor 1 and a second current sensor 10 configured to detect a three-phase current luvw2 flowing through the winding of the second motor 2. The first current sensor 9 and the second current sensor 10 are for example Hall element current sensors. A Hall element current sensor converts into a voltage a magnetic flux generated by an electric current to be measured. A voltage outputted from a Hall element current sensor is equivalent to a value corresponding to an electric current to be measured. The first current sensor 9 and the second current sensor 10 are connected to a controller 7 via signal lines. The first current sensor 9 and the second current sensor 10 detect current values and transmit them to the controller 7 via the signal lines.

In Embodiment 1, as shown in FIG. 1, the three-phase power line 12 is provided with a switching unit 8. The switching unit 8 is connected to the controller 7 via a signal line. The switching unit 8 alternately switches between two states, namely an on state in which the second motor 2 is electrically connected to the power converter 20 and an off state in which the second motor 2 is electrically disconnected from the power converter 20, in accordance with a switching instruction signal SW that the switching unit 8 receives from the controller 7. The switching unit 8 is for example a relay.

The controller 7 is connected to a high-level control unit 13 and the power converter 20 via signal lines. The high-level control unit 13 is situated upstream of the controller 7 in a signal system. The high-level control unit 13 is a controller configured to give commands to the controller 7. Examples of the commands include a speed command value ω_ref, which serves as a command value of the speed of rotation of the motor, and a stop command to stop the rotation of the motor. In giving a stop command to the controller 7, the high-level control unit 13 transmits to the controller 7 a normal stop signal representing the stop command. The high-level control unit 13 is configured, for example, to have a CPU (central processing unit; not illustrated) and a memory (not illustrated). The memory has a program stored therein, and the CPU executes a process in accordance with the program stored in the memory.

The high-level control unit 13 includes a determination process unit 131 configured to determine whether an abnormality has occurred in the power converter 20. Since deactivation of the power converter 20 due to an abnormality having occurred in a case in which the switching unit 8 is in the on state causes a circulating current to be generated between the first motor 1 and the second motor 2, it is important to determine whether an abnormality has occurred. Having determined that an abnormality has occurred in the power converter 20, the determination process unit 131 transmits to the controller 7 an abnormal stop signal, attributed to an abnormal stop, that gives an instruction to stop.

Although, in the block diagram shown in FIG. 1, the controller 7 and the high-level control unit 13 are separate components, these components may be provided on one control substrate. In this case, current detection information including current values that the first current sensor 9 and the second current sensor 10 detect may be inputted to the determination process unit 131. Further, error-and-correction information on wiring connections, communication connection information on normality and abnormality of communication, and bus voltage information on fluctuations in bus voltage in the entire circuit regarding the supply of electric power to the first motor 1 and the second motor 2 may be inputted to the determination process unit 131. These pieces of input information may be used to determine whether an abnormality has occurred not only in the power converter 20 but also in the entire circuit regarding the supply of electric power to the first motor 1 and the second motor 2.

Figure 2:
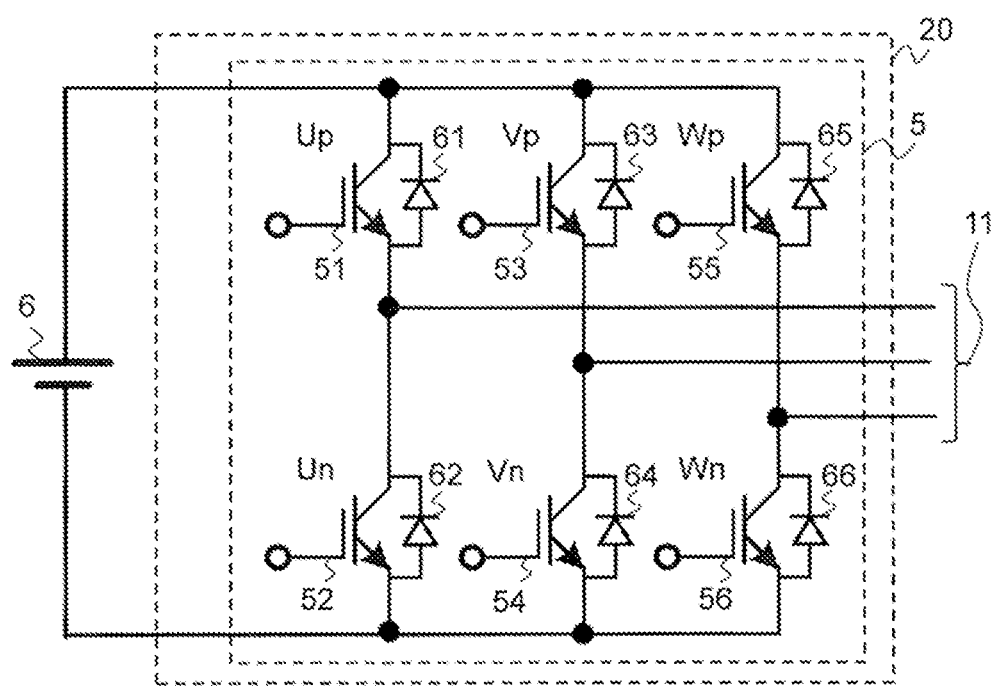
FIG. 2 is a block diagram showing an example configuration of a power converter shown in FIG. 1.

A configuration of the power converter 20 shown in FIG. 1 is described. FIG. 2 is a block diagram showing an example configuration of the power converter shown in FIG. 1. The power converter 20 includes an inverter 5 configured to convert into a three-phase alternating-current voltage a direct-current voltage outputted from the power source 6. The inverter 5 includes three pairs of switching elements in correspondence with the three phases, namely the U, V, and W phases.

Specifically, for the U phase, the inverter 5 includes a switching element 51 connected to a positive electrode of the power source 6 and a switching element 52 connected to a negative electrode of the power source 6. A backflow preventing element 61 is connected in parallel to the switching element 51, and a backflow preventing element 62 is connected in parallel to the switching element 52. Further, for the V phase, the inverter 5 includes a switching element 53 connected to the positive electrode of the power source 6 and a switching element 54 connected to the negative electrode of the power source 6. A backflow preventing element 63 is connected in parallel to the switching element 53, and a backflow preventing element 64 is connected in parallel to the switching element 54. For the W phase, the inverter 5 includes a switching element 55 connected to the positive electrode of the power source 6 and a switching element 56 connected to the negative electrode of the power source 6. A backflow preventing element 65 is connected in parallel to the switching element 55, and a backflow preventing element 66 is connected in parallel to the switching element 56.

In FIG. 2, Up indicates the U-phase positive-electrode-side switching element 51, and Un indicates the U-phase negative-electrode-side switching element 52. Vp indicates the V-phase positive-electrode-side switching element 53, and Vn indicates the V-phase negative-electrode-side switching element 54. Wp indicates the W-phase positive-electrode-side switching element 55, and Wn indicates the W-phase negative-electrode-side switching element 56.

The inverter 5 receives a three-phase voltage command value Vuvw_ref from the controller 7. The inverter 5 compares the waveform of the three-phase voltage command value Vuvw_ref with that of a carrier wave and performs power conversion based on PWM (pulse width modulation) control. The inverter 5 supplies both the first motor 1 and the second motor 2 or the first motor 1 with electric power obtained by converting the direct-current voltage of the power source 6 into the three-phase alternating-current voltage.

Figure 3:
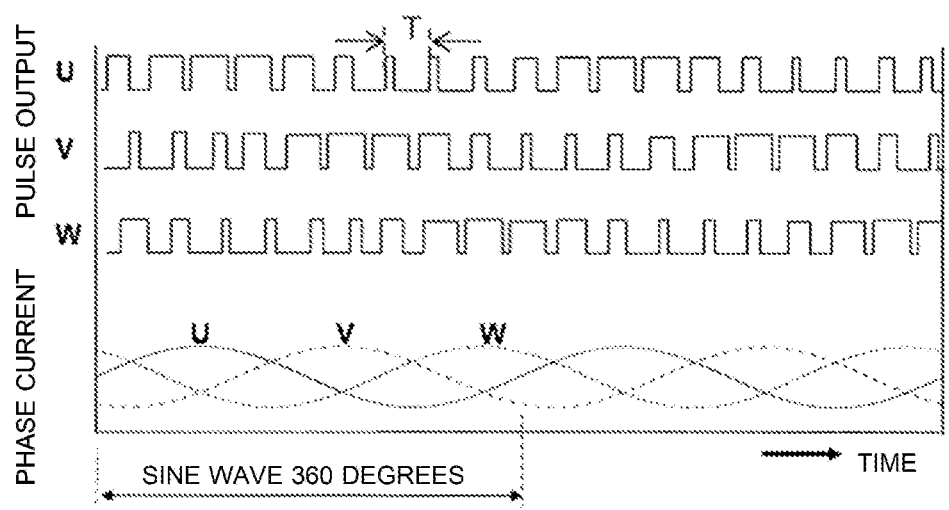
FIG. 3 is a diagram showing an example of PWM control that is executed on an inverter shown in FIG. 2.

FIG. 3 is a diagram showing an example of the PWM control that is executed on the inverter shown in FIG. 2. The upper part of the vertical axis of FIG. 3 represents pulse outputs that are inputted to the switching elements of the three phases, and the lower part of the vertical axis represents current values of the three phases. The horizontal axis of FIG. 3 represents time. The PWM control is control by which to supply an optimum voltage to the motor by changing a duty ratio Dr, which indicates a rate of duration of time for which a switching element is in an on state, for each period T. A comparison between the upper and lower parts of FIG. 3 shows that an increase in duty ratio Dr during a time series variation in pulse output shown in the upper part leads to an increase in current value shown in the lower part.

Specific examples of materials of which the switching elements 51 to 56 and the backflow preventing elements 61 to 66 are made are described here. As a substrate material of the switching elements 51 to 56 and the backflow preventing elements 61 to 66, a semiconductor made of silicon (Si) may be used. As a substrate material of the switching elements 51 to 56 and the backflow preventing elements 61 to 66, a wide bandgap semiconductor made of a semiconductor as typified by silicon carbide (SiC), gallium nitride (GaN), and diamond may be used.

When made of a wide bandgap semiconductor, the switching elements 51 to 56 and the backflow preventing elements 61 to 66 are high in both electric strength and current-carrying capacity and can therefore be reduced in size. Using the switching elements 51 to 56 and the backflow preventing elements 61 to 66 reduced in size makes it possible to reduce the size of a semiconductor module in which these elements are incorporated. Further, when made of a wide bandgap semiconductor, the switching elements 51 to 56 and the backflow preventing elements 61 to 66 are also high in heat resistance. This makes it possible to reduce the size of a cooling mechanism needed for the inverter 5 to dissipate heat. Examples of the cooling mechanism include a radiator fin and a water-cooling mechanism. Further, for example, a simplified cooling system can be attained by changing from a water-cooling system to an air-cooling system that is simpler in structure than the water-cooling system. This makes it possible to further reduce the size of the semiconductor module in which the switching elements 51 to 56 and the backflow preventing elements 61 to 66 are incorporated.

Furthermore, when made of a wide bandgap semiconductor, the switching elements 51 to 56 and the backflow preventing elements 61 to 66 are low in power loss and have improved power conversion efficiency. This makes it possible to drive the first motor 1 or the second motor 2 with high conversion efficiency. Although it is desirable that both the switching elements 51 to 56 and the backflow preventing elements 61 to 66 be made of a wide bandgap semiconductor, either the switching elements 51 to 56 or the backflow preventing elements 61 to 66 may be made of a wide bandgap semiconductor.

In the configuration shown in FIG. 1, the power source 6 does not need to be provided in the motor control device 30. Further, the power source 6 is not limited to the direct-current voltage power source. The power source 6 may for example be a three-phase alternating-current voltage power source. In this case, the power converter 20 may further include a diode rectification circuit configured to convert into a direct-current voltage an alternating-current voltage supplied from the three-phase alternating-current voltage source and output the direct-current voltage. Further, since, in Embodiment 1, the power converter 20 does not include a component other than the inverter 5 as main component, the following illustrates a case in which that the power converter 20 is the inverter 5.

Figure 4:
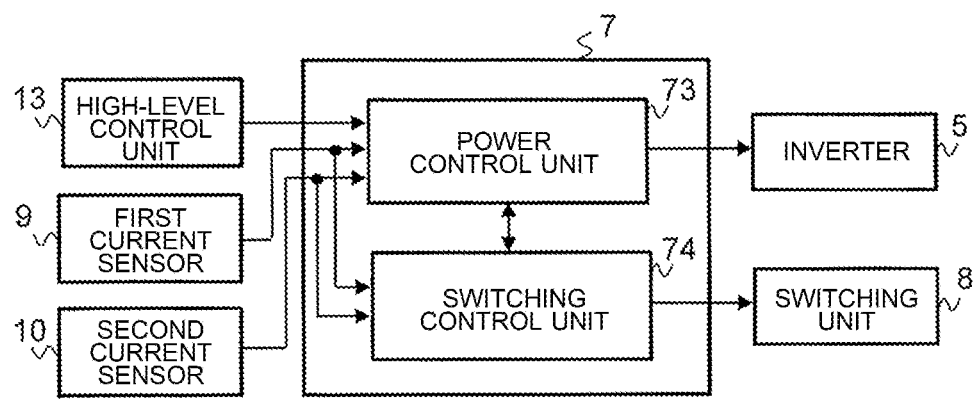
FIG. 4 is a functional block diagram showing an example configuration of a controller shown in FIG. 1.

Next, a configuration of the controller 7 shown in FIG. 1 is described. FIG. 4 is a functional block diagram showing an example configuration of the controller shown in FIG. 1. As shown in FIG. 1, the controller 7 includes a memory 72 in which a program is stored and a CPU 71 configured to execute a process in accordance with the program. As shown in FIG. 4, the controller 7 includes a power control unit 73 configured to control an output from the inverter 5 and a switching control unit 74 configured to control the switching unit 8. The power control unit 73 and the switching control unit 74 are constituted by the CPU 71 executing the program.

The memory 72 has a first threshold Ith1 and a second threshold Ith2 stored therein as criteria for determination of state switching of the switching unit 8. The first threshold Ith1 is a current value that does not put a load on the switching unit 8, and is a value that allows the switching unit 8 to safely switch from the on state to the off state. The second threshold Ith2 is a value close to a level of demagnetization at which the permanent magnet of the motor becomes demagnetized, and is a value that puts a load on the switching unit. The second threshold Ith2 is set to a value calculated based on a predetermined level of demagnetization of the motor and a rate of change in electric current. The second threshold Ith2 is a value greater than the first threshold Ithe1.

The power control unit 73 receives the speed command value ω_ref from the high-level control unit 13, receives a current value representing the three-phase current Iuvw1 from the first current sensor 9, and receives a current value representing the three-phase current Iuvw2 from the second current sensor 10. The power control unit 73 generates a three-phase voltage command value Vuvw_ref based on the speed command value ω_ref, the three-phase current Iuvw1, and the three-phase current Iuvw2. The power control unit 73 outputs the three-phase voltage command value Vuvw_ref to the inverter 5 and performs the PWM control on the inverter 5.

Further, upon receiving from the high-level control unit 13 a normal stop signal based on a stop command, the power control unit 73 performs zero current control by which to control the power converter 20 to cancel out an electric current flowing through each motor. The zero current control is control by which to, based on a current value detected by at least either of the first and second current sensors 9 and 10, output to the inverter 5 a command to produce a pulse output that cancels out an electric current flowing through each motor. By the inverter 5 supplying electric power to the first motor 1 and the second motor 2 in accordance with the zero current control, the amount of circulating current flowing between the two motors via the three-phase power line 11 and the three-phase power line 12 is reduced. This makes it possible to, in a case in which the two motors normally stop, prevent the two motors from being demagnetized.

After having performed the zero current control, the power control unit 73 deactivates the inverter 5 in a case in which a current value detected by the second current sensor 10 is less than or equal to the first threshold Ith1. On the other hand, upon receiving from the high-level control unit 13 an abnormal stop signal, attributed to the occurrence of an abnormality, that excludes a normal stop signal representing a stop command, the power control unit 73 deactivates the inverter 5 to preferentially prevent demagnetization of the first motor 1 and the second motor.

The switching control unit 74 outputs a switching instruction signal SW in tandem with the control that the power control unit 73 performs on the inverter 5. A switching instruction signal SW is a signal that gives the switching unit 8 an instruction to switch from the off state to the on state or a signal that gives the switching unit 8 an instruction to switch from the on state to the off state.

When a current value detected by the second current sensor 10 becomes less than or equal to the first threshold Ith1 after the power control unit 73 has performed the zero current control, the switching control unit 74 transmits to the switching unit 8 a switching instruction signal SW that gives an instruction to switch from the on state to the off state. This is intended for the switching unit 8 to safely switch to the off state without being damaged.

When the power control unit 73 deactivates the inverter 5 due to the occurrence of an abnormality, the switching control unit 74 transmits to the switching unit 8 a switching instruction signal SW that gives an instruction to switch from the on state to the off state, even if a current value detected by the second current sensor 10 is greater than or equal to the second threshold Ith2. In this case, since a large current close to the level of demagnetization is flowing through the switching unit 8, the switching unit 8 may be damaged and reach a breakdown. Even in such a case, bringing the switching unit 8 into the off state prevents a large circulating current from flowing between the two motors. This can result in prevention of demagnetization of the permanent magnet provided in either of the two motors.

Although Embodiment 1 has illustrated a case in which the controller 7 communicates with the inverter 5, the switching unit 8, the high-level control unit, and the current detector 40 by cable, the controller 7 may communicate with these pieces of equipment by radio. Further, the high-level control unit 13 and the controller 7 may be integrated with each other. For example, the controller 7 may include a function of the high-level control unit 13.

Figure 5:
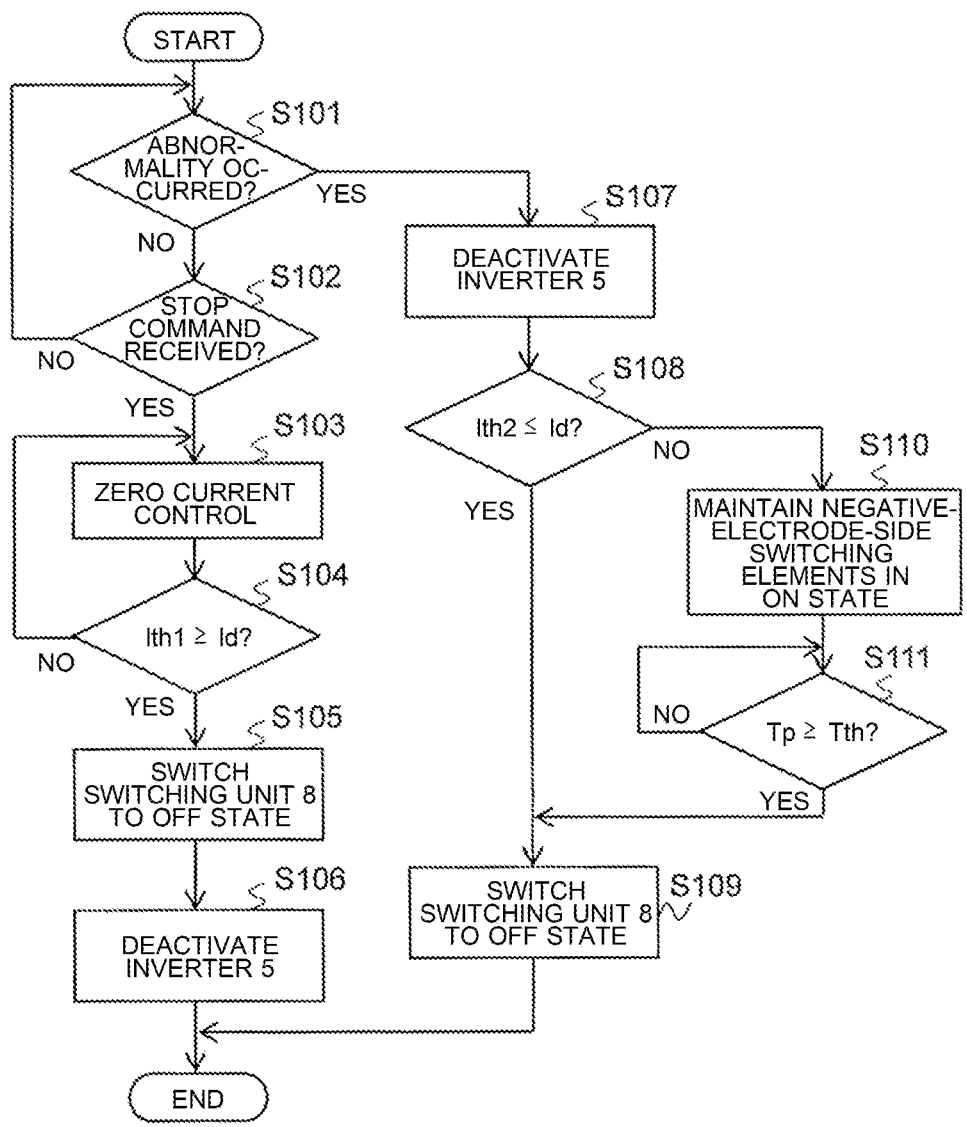
FIG. 5 is a flow chart showing steps of an operation of the motor control device shown in FIG. 1.

Next, an operation of the motor control device 30 shown in FIG. 1 is described. FIG. 5 is a flow chart showing steps of the operation of the motor control device 30 shown in FIG. 1. Assume that at an early stage, the switching unit 8 is in the on state and the power converter 20 is supplying electric power to both the first motor 1 and the second motor 2. Further, assume also that since the second current sensor 10 detects an electric current flowing through the switching unit 8, the three-phase current Iuvw2 that the second current sensor 10 detects is a current value Id and the controller 7 exercises control based on the current value Id. The current value that the controller 7 uses for determination of control may be the three-phase current Iuvw1 that the first current sensor 9 detects.

The controller 7 determines whether it receives an abnormal stop signal and a normal stop signal from the high-level control unit 13 (steps S101 and S102). In a case in which the controller 7 receives neither a normal stop signal nor an abnormal stop signal, the controller 7 returns to step S101 and continues monitoring of commands that it receives from the high-level control unit 13.

On the other hand, when the controller 7 does not receive an abnormal stop signal from the high-level control unit 13 in step S101 but receives a normal stop signal from the high-level control unit 13 in step S102, the power control unit 73 performs the zero current control on the inverter 5 (step S103). After the power control unit 73 has performed the zero current control, the switching control unit 74 determines whether the current value Id detected by the second current sensor 10 is less than or equal to the first threshold Ith1 (step S104). In a case in which the current value Id is less than or equal to the first threshold Ith1, the switching control unit 74 transmits to the switching unit 8 a switching instruction signal SW that gives an instruction to switch from the on state to the off state (step S105). Then, the power control unit 73 deactivates the inverter 5 (step S106).

On the other hand, in a case in which the current value Id is greater than the threshold Ith1 as a result of the determination made in step S104, the power control unit 73 returns to step S103 and performs the zero current control on the inverter 5 again. The power control unit 73 repeats the process of step S103 until the current value Id becomes less than or equal to the first threshold Ith1.

Figure 6:
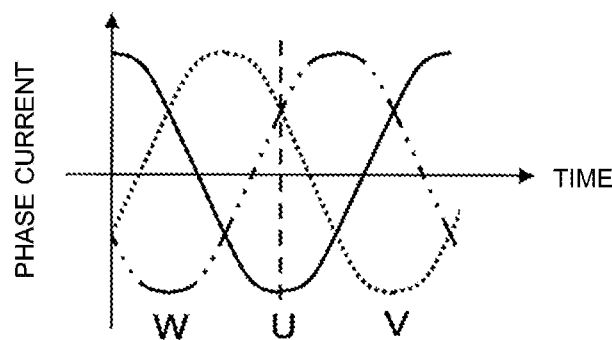
FIG. 6 is a diagram showing examples of phase currents that flow through a three-phase power line shown in FIG. 1.
Figure 7:
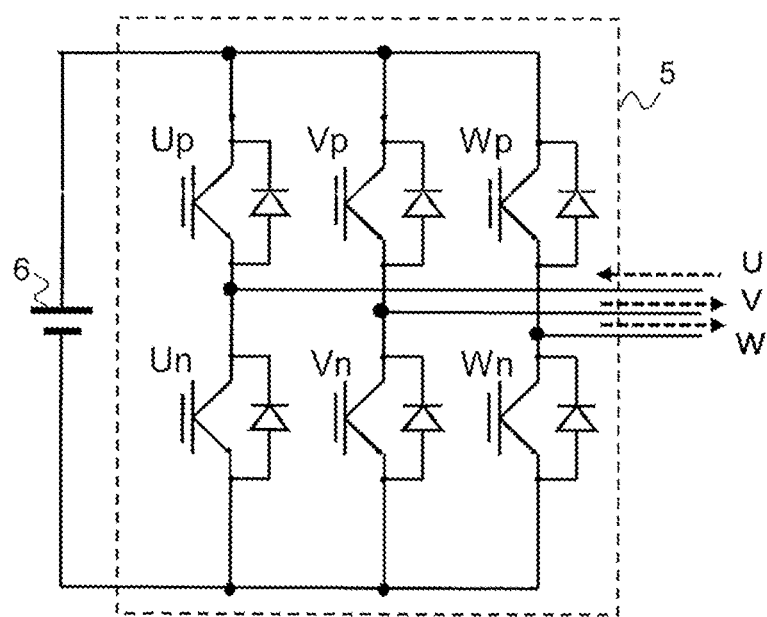
FIG. 7 is a schematic view showing the current directions of the phase currents shown in FIG. 6 at a point in time indicated by a dashed line.

A specific example of the zero current control is described here with reference to FIGS. 6 to 11. FIG. 6 is a diagram showing examples of phase currents that flow through a three-phase power line shown in FIG. 1. The vertical axis of FIG. 6 represents phase current, and the horizontal axis of FIG. 6 represents time. The horizontal axis may represent phase θ. FIG. 7 is a schematic view showing the current directions of the phase currents shown in FIG. 6 at a point in time indicated by a dashed line. The currents at the point in time indicated by the dashed line in FIG. 6 serve as reference currents to be canceled out by the zero current control. FIG. 7 uses dashed arrows to indicate the directions of electric currents that flow separately through each of the phases while the inverter 5 is operating. Performing the zero current control to pass electric currents in directions opposite to the current directions shown in FIG. 7 and cancel out the reference currents shown in FIG. 6 is described.

Figure 8:
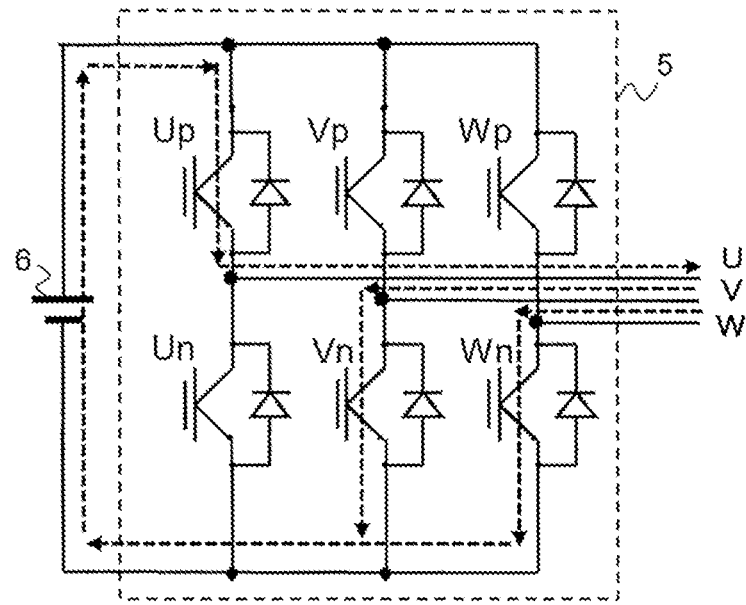
FIG. 8 is a diagram showing the directions of electric currents that separately cancel out an electric current of each of the phases shown in FIG. 7.
Figure 9:
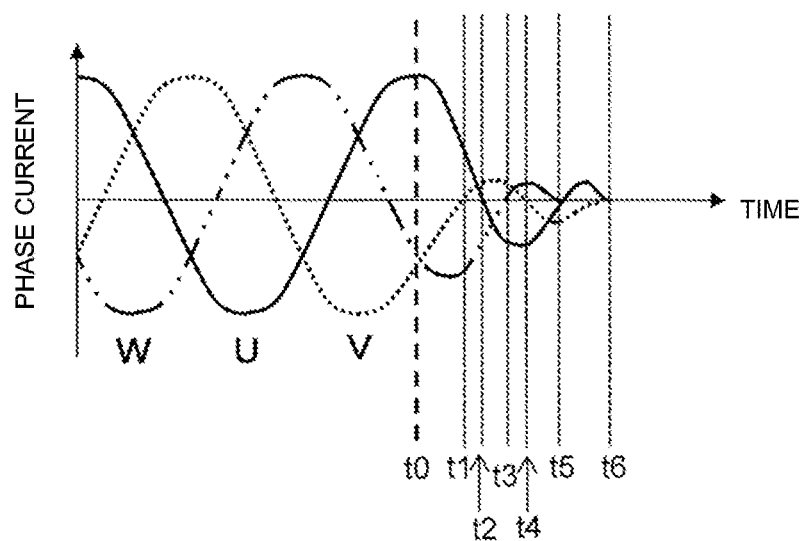
FIG. 9 is a diagram showing examples of phase currents that cancel out reference currents shown in FIG. 6.

FIG. 8 is a diagram showing the directions of electric currents that separately cancel out an electric current of each of the phases shown in FIG. 7. FIG. 9 is a diagram showing examples of phase currents that cancel out the reference currents shown in FIG. 6. The vertical axis of FIG. 9 represents phase current, and the horizontal axis of FIG. 9 represents time. The horizontal axis may represent phase θ. A comparison between FIGS. 7 and 8 shows that the direction of the electric current of each of the U, V, and W phases in FIG. 7 is opposite to the direction of the electric current of a corresponding one of the U, V, and W phases in FIG. 8. In FIG. 9, the time t0 is time to start a brake on the rotation of the motor. In FIG. 9, the period from the time t0 to the time t6 is divided into a plurality of time intervals for the purpose of explaining control over each switching element. Since the zero current control cancels out an electric current flowing through the motor, the electric currents flowing separately through each of the phases converge to zero ampere as shown in FIG. 9.

Figure 10:
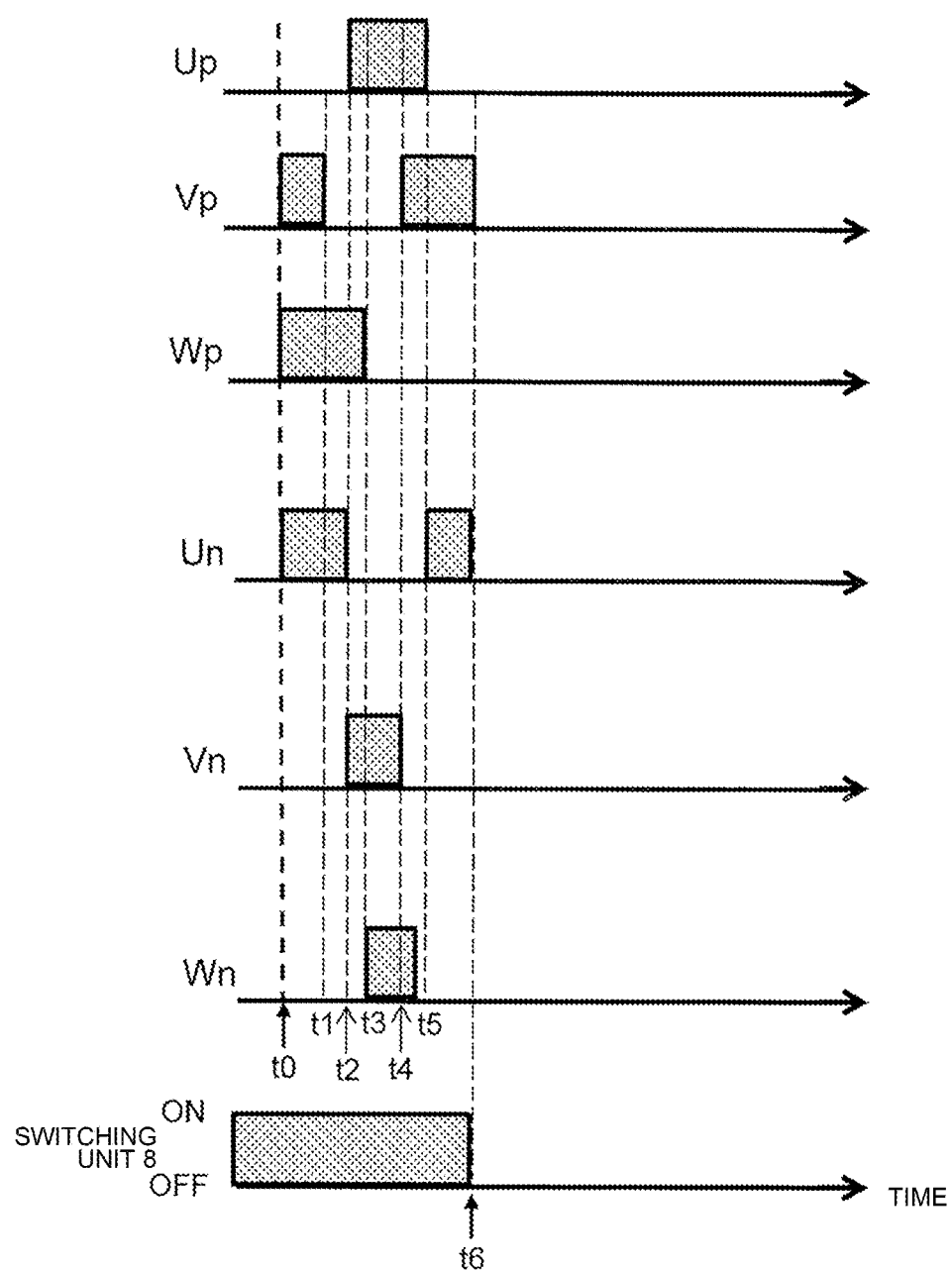
FIG. 10 is a diagram showing control over each switching element for producing the phase currents shown in FIG. 9.
Figure 11:
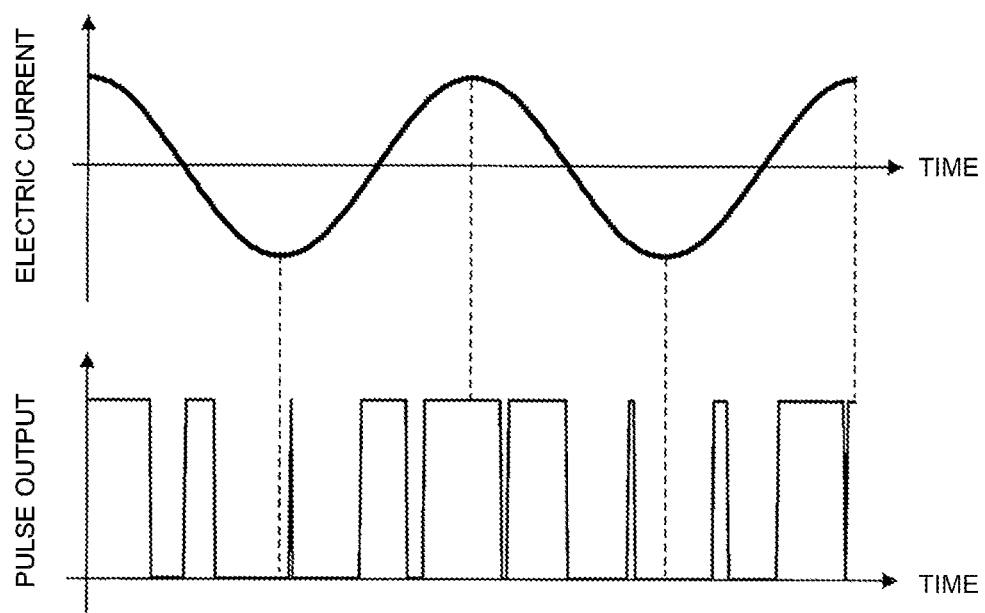
FIG. 11 is an enlarged view showing an example of a pulse output to each switching element shown in FIG. 10.

FIG. 10 is a diagram showing control over each switching element for producing the phase currents shown in FIG. 9. The horizontal axis of FIG. 10 represents time. The vertical axis of FIG. 10 represents pulse outputs to the switching elements 51 to 56 and the state of the switching unit 8. FIG. 11 is an enlarged view showing an example of a pulse output to each switching element shown in FIG. 10. Since the waveform of a pulse output to each switching element is too fine to illustrate, FIG. 10 simplifies the waveform down to a rectangular waveform. Although not shown in FIG. 10, the waveform of a pulse output to each switching element is a waveform that increases in duty ratio Dr in proportion to the magnitude of an electric current flowing along.

Referring to FIG. 9, a U-phase current (>0), a V-phase current (<0), and a W-phase current (<0) are flowing through the motor during the period from the time t0 to the time t1. For this reason, as shown in FIG. 10, the power control unit 73 controls the inverter 5 so that a U-phase current (<0), a V-phase current (>0), and a W-phase current (>0) are attained. Since a U-phase current (>0), a V-phase current (>0), and a W-phase current (<0) are flowing through the motor during the period from the time t1 to the time t2, the power control unit 73 controls the inverter 5 so that a U-phase current (<0), a V-phase current (<0), and a W-phase current (>0) are attained.

Since a U-phase current (<0), a V-phase current (>0), and a W-phase current (<0) are flowing through the motor during the period from the time t2 to the time t3, the power control unit 73 controls the inverter 5 so that a U-phase current (>0), a V-phase current (<0), and a W-phase current (>0) are attained. Since a U-phase current (<0), a V-phase current (>0), and a W-phase current (>0) are flowing through the motor during the period from the time t3 to the time t4, the power control unit 73 controls the inverter 5 so that a U-phase current (>0), a V-phase current (<0), and a W-phase current (<0) are attained.

Since a U-phase current (<0), a V-phase current (<0), and a W-phase current (>0) are flowing through the motor during the period from the time t4 to the time t5, the power control unit 73 controls the inverter 5 so that a U-phase current (>0), a V-phase current (>0), and a W-phase current (<0) are attained. Since a U-phase current (>0), a V-phase current (<0), and a W-phase current (=0) are flowing through the motor during the period from the time t5 to the time t6, the power control unit 73 controls the inverter 5 so that a U-phase current (<0), a V-phase current (>0), and a W-phase current (=0) are attained. Moreover, as shown in FIG. 10, at the time t6, the U phase current, the V phase current, and the W-phase current become zero ampere, and the switching control unit 74 switches the switching unit 8 from the on state to the off state.

Upon receiving an abnormal stop signal from the high-level control unit 13 in the determination of step S101 shown in FIG. 5, the power control unit 73 deactivates the inverter 5 (step S107). After deactivation of the inverter 5, the power control unit 73 and the switching control unit 74 determine whether the current value Id is greater than or equal to the second threshold Ith2 (step S108). In a case in which the current value Id is greater than or equal to the second threshold Ith2 in step S108, the switching control unit 74 transmits to the switching unit 8 a switching instruction signal SW that gives an instruction to switch from the on state to the off state (step S109). This puts a loads on the switching unit 8, but is intended to preferentially prevent demagnetization of the motor.

The second threshold Ith2, which is used in the determination of step S108, is calculated based on the level of magnetization of the motor and the rate of change in electric current. Therefore, it is desirable that the second threshold Ith2 be set so that a margin between the level of demagnetization and the second threshold Ith2 widens when the rate of change in electric current is high and narrows when the rate of change in electric current is low. Further, it is desirable that the second threshold Ith2 be calculated based on the level of demagnetization and the rate of change in electric current in consideration of a period of time of approximately 10 [ms] required for the switching unit 8 to switch from the on state to the off state.

On the other hand, in a case in which the current value Id is less than the second threshold Ith2 in the determination of step S108, the power control unit 73 performs on-state maintenance control by which to maintain the three positive-electrode-side or negative-electrode-side switching elements of the three phase in an on state (step S110). This is intended to reduce the speed of rotation of the first motor 1 and the second motor 2 and reduce the amount of circulating current flowing through the three-phase power line 11 and the three-phase power line 12. Assume here that the power control unit 73 has performed the on-state maintenance control on the negative-electrode-side switching elements 52, 54, and 56.

The power control unit 73 and the switching control unit 74 determine whether a period of time Tp having elapsed since the power control unit 73 brought the negative-electrode-side switching elements 52, 54, and 56 into the on state is longer than or equal to a predetermined period of time Tth (step S111). When the elapsed period of time Tp becomes equal to the predetermined period of time Tth, the power control unit 73 brings the switching elements 52, 54, and 56 into an off state. Further, when the elapsed period of time Tp becomes equal to the predetermined period of time Tth, the switching control unit 74 determines that the speed of rotation of the motor has been sufficiently reduced, and proceeds to step S109 to switch the switching unit 8 from the on state to the off state.

Figure 12:
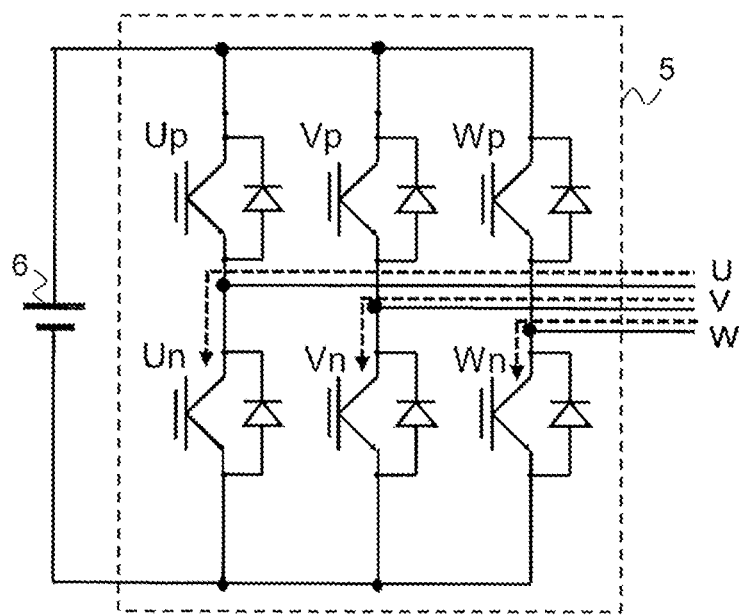
FIG. 12 is a schematic view showing the current directions of the phase currents at the time when the negative-electrode-side switching elements shown in FIG. 2 are in an on state.
Figure 13:
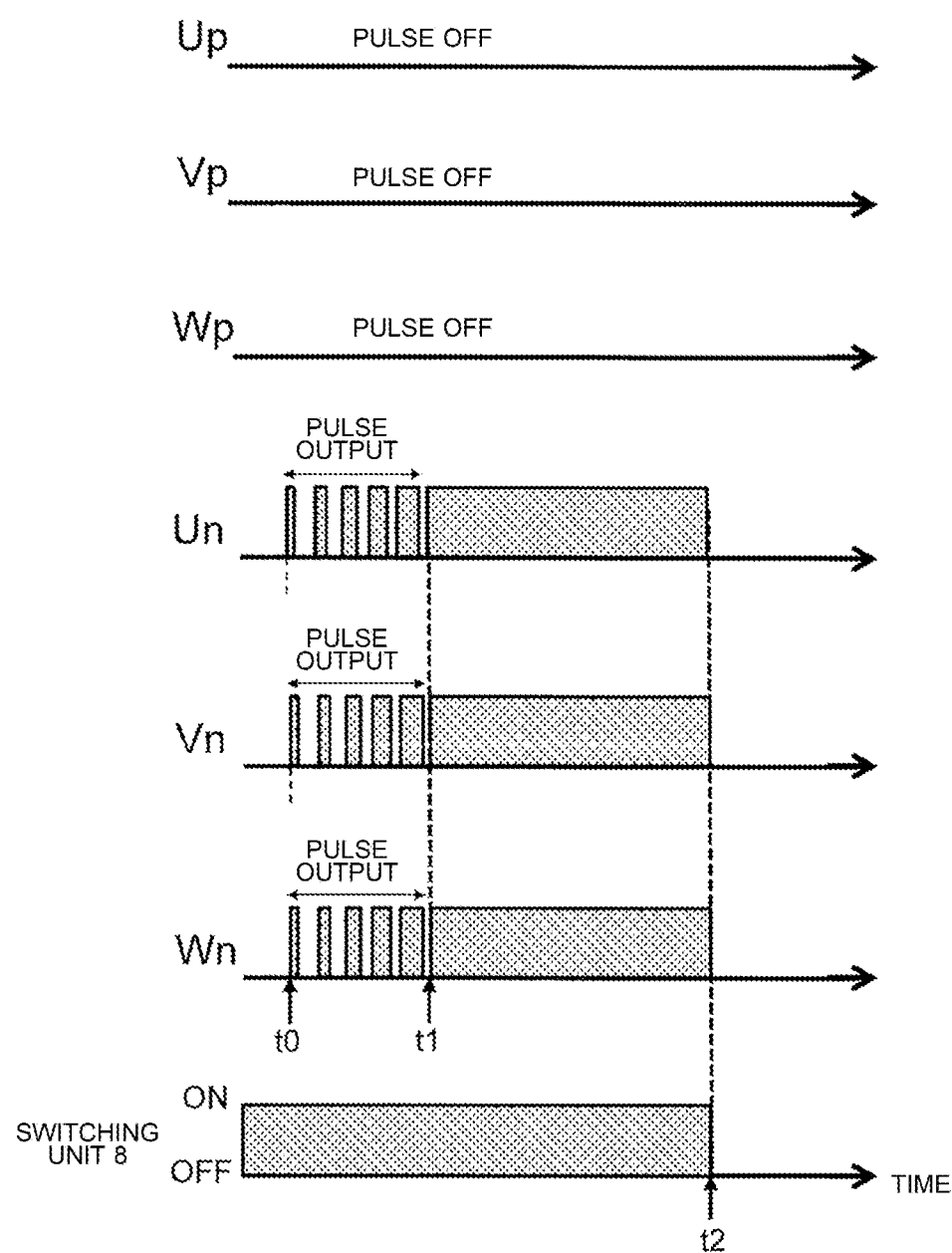
FIG. 13 is a diagram showing control over each switching element for reducing the speed of rotation of a motor shown in FIG. 1.

A specific example of the on-state maintenance control by which to maintain t the negative-electrode-side switching elements 52, 54, and 56 in the on state is described here with reference to FIGS. 12 and 13. FIG. 12 is a schematic view showing the current directions of the phase currents at the time when the negative-electrode-side switching elements shown in FIG. 2 are in the on state. FIG. 13 is a diagram showing control over each switching element for reducing the speed of rotation of the motor shown in FIG. 1. The horizontal axis of FIG. 13 represents time. The vertical axis of FIG. 13 represents pulse outputs to the switching elements 51 to 56 and the state of the switching unit 8.

In FIG. 13, the time t0 is time to start a brake on the rotation of the motor. As shown in FIG. 13, the power control unit 73 brings pulses to the positive-electrode-side switching elements 51, 53, and 55 into an off state. During the period from the time t0 to the time t1, the power control unit 73 outputs pulses to the negative-electrode-side switching elements 52, 54, and 56. At the time t1, the power control unit 73 maintains all of the negative-electrode-side switching elements 52, 54, and 56 in the on state. The positive-electrode-side switching elements 51, 53, and 55 maintain the off state, and the negative-electrode-side switching elements 52, 54, and 56 maintain the on state. This maintains a state in which no electric current is supplied to the motor but an electric current flows out from the motor. As time elapses, the current flowing through the motor gradually decreases, so that the speed of rotation of the motor is reduced.

At the time t2, the power control unit 73 switches all of the negative-electrode-side switching elements 52, 54, and 56 to the off state. At the time t2, the switching control unit 74 switches the switching unit 8 from the on state to the off state. Although the foregoing has illustrated a case in which the on-state maintenance control is performed on the negative-electrode-side switching elements 52, 54, and 56, the on-state maintenance control may be performed on the positive-electrode-side switching elements 51, 53, and 55. In this case, the power control unit 73 needs only perform the on-state maintenance control after bringing all of the negative-electrode-side switching elements 52, 54, and 56 into the on state and making emitter electrodes of the positive-electrode-side switching elements 51, 53, and 55 equal in voltage.

In Embodiment 1, the second threshold Ith2 is set as a criterion for determination in consideration of the level of demagnetization of the motor. As described with reference to FIG. 5, the controller 7 disconnects the switching unit 8 from the second motor 2 in a case in which an abnormality occurs in a system for supply electric power to the motor and the current value Id of the electric current flowing through the motor is greater than or equal to the second threshold Ith2. This makes it possible to prevent the motor from becoming demagnetized at the time of an abnormality.

Further, in Embodiment 1, the first threshold Ith1 is set as a criterion for determination in consideration of damage to the switching unit 8. As described with reference to FIG. 5, the controller 7 controls the timing of disconnection of the switching unit 8 from the second motor 2 with reference to the first threshold Ith1 at the time of a normal stop based on a stop command. This makes it possible to reduce stress on the switching unit 8 due to disconnection and inhibit the switching unit 8 from shortening its life. Further, in a case in which when an abnormality has occurred in the system for supplying electric power to the motor and the current value Id of the electric current flowing through the motor is less than the second threshold Ith2, the controller 7 controls the timing of disconnection of the switching unit 8 by reducing the speed of rotation of the motor. Reducing the speed of rotation of the motor makes it possible to cause the electric current flowing though the switching unit 8 to decrease faster.

Normally, when switched from the on state to the off state with a large current flowing through the switching unit 8, the switching unit 8 shortens its life. Meanwhile, in Embodiment 1, the performance of the zero current control or the on-state maintenance control by the controller 7 makes it possible to reduce the amount of circulating current flowing through the three-phase power line 11 and the three-phase power line 12. As a result, the controller 7 can safely and quickly switch the switching unit 8 from the on state to the off state.

In stopping the inverter 5 in step S107 of FIG. 5, the power control unit 73 may determine the timing of stoppage of the inverter 5 based on a current vale detected by at least either of the first and second current sensors 9 and 10. Further, although, in step S111, the switching control unit 74 makes a determination based on the elapsed period of time Tp for the purpose of reducing damage to the switching unit 8, the switching control unit 74 may determine whether the current value Id is less than or equal to the first threshold Ith1 (step S104).

Further, even when the inverter 5 is deactivated in step S107 shown in FIG. 5, the first motor 1 and the second motor 2 rotate by inertial force; however, after the inertial force has decreased with time due to air resistance, the first motor 1 and the second motor 2 come to a stop. In a case in which the first motor 1 and the second motor 2 are provided in an outdoor unit of an air-conditioning apparatus, the force of a strong wind blowing outdoors, if any, may cause the first fan 3 and the second fan 4 to rotate to cause the first motor 1 and the second motor 2 to rotate. In this case, the force of the wind causes the first motor 1 and the second motor 2 to rotate in such a direction as to cancel out the circulating current or in such a direction as to increase the circulating current. In Embodiment 1, even in a case in which the first motor 1 and the second motor 2 rotate due to the effects of wind, the controller 7 can safely disconnect the switching unit 8 from the second motor 2 in consideration of the effects of wind based on the value of the electric current flowing through the motor.

A motor control device 30 of Embodiment 1 includes a power converter 20 to which two motors are connected in parallel, a switching unit 8 provided between a second motor 2 and the power converter 20, a current detector 40 configured to detect an electric current flowing through the two motors, and a controller 7. The controller 7 includes a power control unit 73 and a switching control unit 74. The power control unit 73 deactivates the power converter 20 upon receiving from outside a stop signal attributed to the occurrence of an abnormality other than a stop command. The switching control unit 74 switches the switching unit 8 to an off state upon deactivation of the power converter 20.

According to Embodiment 1, the controller 7 deactivates the power converter 20 at the occurrence of an abnormality such as the occurrence of an abnormality in a system for supplying electric power to the motor and switches the switching unit 8 from an on state to the off state after deactivation of the power converter 20. This makes it possible to reduce a circulating current flowing between the first motor 1 and the second motor 2 and prevent demagnetization of permanent magnets provided in the first motor 1 and the second motor 2.

Further, in Embodiment 1, at the time of a normal stop based on a stop command, the controller 7 controls the timing of disconnection of the switching unit 8 by using a first threshold Ith1 as a criterion for determination in consideration of damage to the switching unit 8. This makes it possible to reduce stress on the switching unit 8 due to disconnection and extend the life of the switching unit 8.

Further, in Embodiment 1, at the occurrence of an abnormality, the controller 7 switches the switching unit 8 from the on state to the off state in a case in which a current value detected by the current detector 40 is greater than or equal to a second threshold Ith2 serving as a criterion for determination in consideration of a level of demagnetization. This makes it possible to more surely reduce the circulating current flowing between the first motor 1 and the second motor 2 and prevent demagnetization of the permanent magnets provided in the first motor 1 and the second motor 2. Further, at the occurrence of an abnormality, the controller 7 controls the timing of disconnection of the switching unit 8 by reducing the speed of rotation of the motor in a case in which a current value detected by the current detector 40 is less than the second threshold Ith2. Reducing the speed of rotation of the motor causes the electric current flowing though the switching unit 8 to decrease faster, and makes it possible to safely and quickly switch the switching unit 8 from the on state to the off state. As a result, the reduction in circulating current not only makes it possible to prevent demagnetization but also makes it possible to prevent the switching unit 8 from reaching a breakdown. This makes it unnecessary to replace the switching unit 8 and makes it possible to restart the second motor 2 in a shorter period of time.

Embodiment 2

Embodiment 2 differs in configuration of a current detector from Embodiment 1. In Embodiment 2, components similar to those of Embodiment 1 are given identical signs, and a detailed description of such components is omitted.

Figure 14:
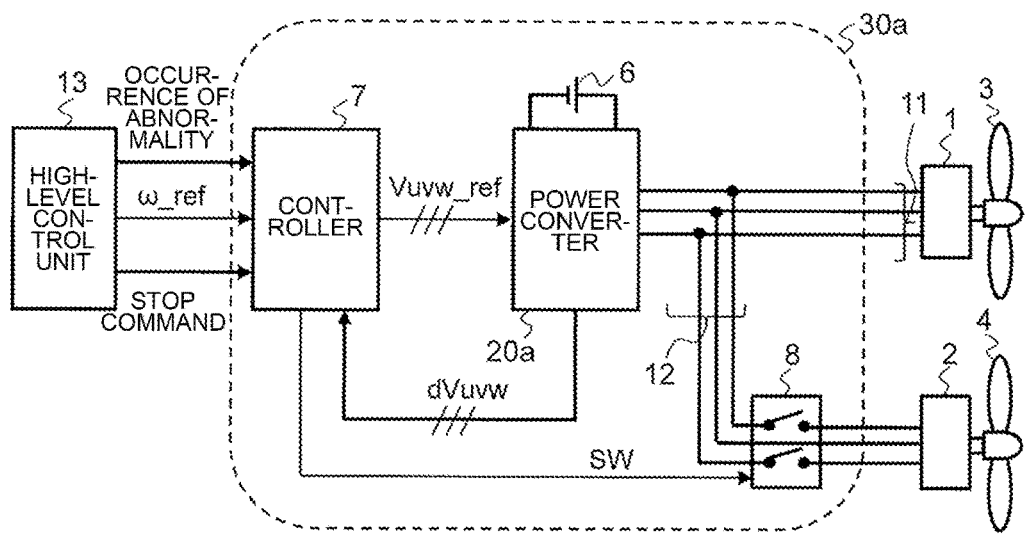
FIG. 14 is a block diagram showing an example configuration of a motor control device according to Embodiment 2 of the present disclosure.
Figure 15:
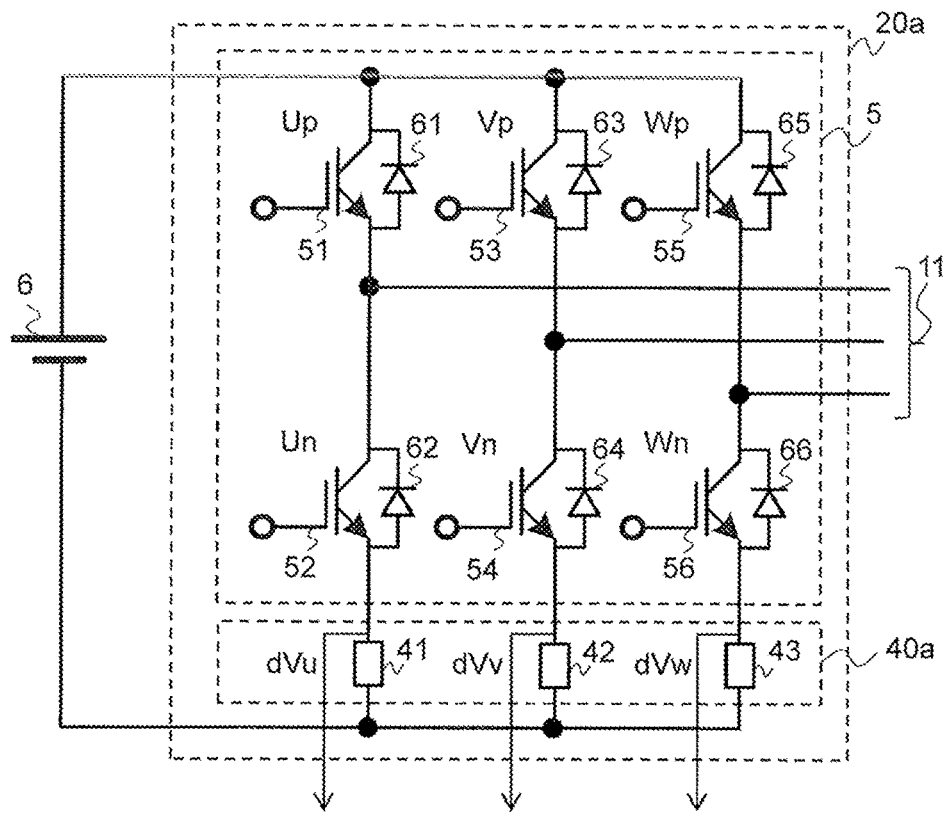
FIG. 15 is a block diagram showing an example configuration of a power converter shown in FIG. 14.

A configuration of a motor control device of Embodiment 2 is described. FIG. 14 is a block diagram showing an example configuration of a motor control device according to Embodiment 2 of the present disclosure. FIG. 15 is a block diagram showing an example configuration of a power converter shown in FIG. 14. As shown in FIGS. 14 and 15, a motor control device 30a has a current detector 40a provided in a power converter 20a instead of the current detector 40 shown in FIG. 1. As shown in FIG. 15, the current detector 40a includes shunt resistors 41 to 43.

The shunt resistors 41 to 43 are resistive elements serving as current detection elements configured to detect voltage drops corresponding to electric currents flowing through the U, V, and W phases, respectively. The shunt resistor 41 is provided between the negative electrode of the power source 6 and the switching element 52. The shunt resistor 42 is provided between the negative electrode of the power source 6 and the switching element 54. The shunt resistor 43 is provided between the negative electrode of the power source 6 and the switching element 56.

The current detector 40a detects, as a detected value corresponding to the electric current flowing through the U phase, a drop voltage dVu produced by an electric current flowing through the shunt resistor 41. The current detector 40a detects, as a detected value corresponding to the electric current flowing through the V phase, a drop voltage dVv produced by an electric current flowing through the shunt resistor 42. The current detector 40a detects, as a detected value corresponding to the electric current flowing through the W phase, a drop voltage dVw produced by an electric current flowing through the shunt resistor 43. The current detector 40a calculates a sum drop voltage Vsum by adding together the drop voltages dVu, dVv, and dVw thus detected of the respective phases, and transmits the sum drop voltage Vsum to the controller 7. The controller 7 calculates from the sum drop voltage Vsum an electric current flowing through the motor.

Although FIG. 15 illustrates a case in which the shunt resistors 41 to 43 are provided between the switching elements 52, 54, and 56, respectively, and the negative electrode of the power source 6, the shunt resistors 41 to 43 may be provided between the switching elements 51, 53, and 55, respectively, and the positive electrode of the power source 6. Further, a detailed description of an operation of the motor control device 30a of Embodiment 2 is omitted, as the operation is similar to that described in Embodiment 1.

Embodiment 2 makes it possible to, even without providing the first current sensor 9 and the second current sensor 10 as sensors to detect an electric current flowing through the motor, mount the current detector 40a, which includes the shunt resistors 41 to 43, as a current detection element on a substrate on which the inverter 5 is provided. This makes it possible to keep down the cost of manufacturing the motor control device.

Further, providing the shunt resistors 41 to 43 in correspondence with the three phases of current allows the current detector 40a to, even if any one of the shunt resistors breaks down due, for example, to an overcurrent, provide the controller 7 with a sum drop voltage based on the remaining two shunt resistors. Based on the sum drop voltage that the controller 7 receives from the current detector 40a, the controller 7 can maintain control over the inverter 5 by interpolating an undetectable phase current by using the two other phase currents.

Although Embodiments 1 and 2 have illustrated the case of a configuration in which the fans are attached to the first motor 1 and the second motor 2, the fans are not the only components that are connected to the motors. A motor to which a piece of equipment other than a fan is connected may be controlled, and Embodiments 1 and 2 may be applied to a technology for driving a motor to which a piece of equipment other than a fan is connected. Further, although Embodiments 1 and 2 have illustrated the case of a configuration in which two motors are connected in parallel to one inverter 5, the number of motors that are connected is not limited to 2. Three or more motors may be connected in parallel to the inverter 5.

For example, assuming that N is an integer greater than or equal to 3, the case of a motor control device intended to control N motors is described. In this case, one of the motors serves as a first motor 1, and the remaining (N−1) motors serve as second motors 2. Moreover, the motor control device is provided with (N−1) switching units 8 in correspondence with the number of second motors 2. Even when thus configured, the motor control device can perform control on the power converter 20 and each switching unit 8 in a manner similar to the control described in Embodiments 1 and 2.

REFERENCE SIGNS LIST

1: first motor, 2: second motor, 3: first fan, 4: second fan, 5: inverter, 6: power source, 7: controller, 8: switching unit, 9: first current sensor, 10: second current sensor, 13: high-level control unit, 20, 20a: power converter, 30, 30a: motor control device, 40, 40a: current detector, 41 to 43: shunt resistor, 51 to 56: switching element, 61 to 66: backflow preventing element, 71: CPU, 72: memory, 73: power control unit, 74: switching control unit, 131: determination process unit

The invention claimed is:

1. A motor control device comprising:
a power converter to which a first motor and a second motor are connected in parallel, the power converter being configured to convert a direct-current voltage into an alternating-current voltage and supply the alternating-current voltage to the first motor and the second motor;
a relay provided between the second motor and the power converter and configured to switch between an on state in which the second motor is electrically connected to the power converter and an off state in which the second motor is electrically disconnected from the power converter;

a current detector configured to detect an electric current flowing through the first motor and the second motor; and a controller configured to control the power converter based on at least a current value detected by the current detector, wherein the controller deactivates the power converter upon receiving from outside an abnormal step signal, attributed to occurrence of an abnormality, that excludes a normal stop signal representing a stop command, and switches the switching unit from the on state to the off state upon deactivation of the power converter, upon receiving the normal stop signal from outside, executes zero current control by which to control the power converter to cancel out an electric current detected by the current detector and deactivates the power converter when a current value detected by the current detector becomes less than or equal to a first threshold determined in advance, and after execution of the zero current control, switches the relay from the on state to the off state when a current value detected by the current detector becomes less than or equal to the first threshold.

2. The motor control device of claim 1, wherein in a case in which after deactivation of the power converter, a current value detected by the current detector is greater than or equal to a second threshold determined in advance, the controller switches the relay from the on state to the off state.

3. The motor control device of claim 2, wherein the controller includes an inverter including, in correspondence with three phases of winding provided in each of the first and second motors, three pairs of switching elements composed of positive-electrode-side switching elements and negative-electrode-side switching elements, in a case in which after deactivation of the power converter, a current value detected by the current detector is less than the second threshold, the controller reduces a speed of rotation of the motor by maintaining the three positive-electrode-side or negative-electrode-side switching elements of all of the three phases in an on state, and after reduction of the speed of rotation of the motor, switches the relay from the on state to the off state.

4. The motor control device of claim 3, wherein the current detector includes, in correspondence with the three phases, three resistive elements provided between the three positive-electrode-side or negative-electrode-side switching elements and a power source configured to output the direct-current voltage.

5. The motor control device of claim 3, wherein the switching elements are elements made of a wide bandgap semiconductor.

6. The motor control device of claim 5, wherein the wide bandgap semiconductor is made of silicon carbide, gallium nitride, or diamond.

7. The motor control device of claim 1, wherein in a case in which the relay is in the on state, the controller deactivates the power converter based on a current value detected by the current detector.

8. The motor control device of claim 1, wherein a plurality of the second motors are connected in parallel to the power converter, and a plurality of relays are provided in correspondence with the plurality of second motors.

* * * * *